United States Patent
Allemand et al.

(10) Patent No.: US 7,648,558 B2
(45) Date of Patent: *Jan. 19, 2010

(54) METHOD FOR THE TREATMENT OF ALUMINUM IN A FURNACE

(75) Inventors: Bruno Allemand, Versailles (FR); Jean-Claude Vuillermoz, Versailles (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 388 days.

This patent is subject to a terminal disclaimer.

(21) Appl. No.: 10/555,313

(22) PCT Filed: Mar. 30, 2004

(86) PCT No.: PCT/FR2004/050134

§ 371 (c)(1),
(2), (4) Date: Oct. 31, 2005

(87) PCT Pub. No.: WO2004/099453

PCT Pub. Date: Nov. 18, 2004

(65) Prior Publication Data

US 2007/0034054 A1   Feb. 15, 2007

(30) Foreign Application Priority Data

Apr. 30, 2003   (FR) .................................. 03 05373

(51) Int. Cl.
C22B 21/00   (2006.01)

(52) U.S. Cl. .............................. 75/385; 75/678; 75/403; 266/80; 266/82; 266/85; 266/100

(58) Field of Classification Search .................. 75/680, 75/678, 385; 266/80, 82, 85, 100
See application file for complete search history.

(56) References Cited

U.S. PATENT DOCUMENTS

| 3,759,702 | A | 9/1973 | Horak |
| 5,563,903 | A | 10/1996 | Jebrail et al. |
| 5,616,167 | A * | 4/1997 | Eckert ........................ 75/678 |
| 6,245,122 | B1 * | 6/2001 | Meyers ....................... 75/385 |
| 6,247,416 | B1 | 6/2001 | Beaudoin et al. |
| 2004/0012129 | A1 | 1/2004 | Summer |
| 2005/0103159 | A1 * | 5/2005 | Ducrocq ...................... 75/385 |

FOREIGN PATENT DOCUMENTS

| EP | 0 962 540 | 12/1999 |
| EP | 1 243 663 | 9/2002 |
| JP | 60 121235 | 6/1985 |
| WO | WO 02 20859 | 3/2002 |
| WO | WO 03056044 | * 10/2003 |

OTHER PUBLICATIONS

Paget M. W. et al.: "*A novel burner retrofit used to increase productivity in an aluminium rotary furnace*", International Symposium Recycling of Metals and Engineered Materials, 1990, pp. 671-678.

(Continued)

*Primary Examiner*—Roy King
*Assistant Examiner*—Jie Yang
(74) *Attorney, Agent, or Firm*—Christopher J. Cronin (57) ABSTRACT

Methods for treating aluminum in a furnace. An aluminum charge is introduced into a furnace and melted with heat from at least one burner. The burner is supplied with at least one oxidizer and at least one fuel. The oxidizer is made up of at least 10% oxygen by volume. The concentration of a first gas is measured in the furnace atmosphere or in a flue gas exiting the furnace. The oxidation of the molten aluminum is then reduced by holding the flow rate of the oxidizer steady while varying the flow rate of the fuel, according to the concentration of a second gas in the furnace or in the flue gas exiting the furnace. The concentration of the second gas is determined by comparing the measured species concentration and the intrinsic concentration which would be present absent the aluminum charge.

21 Claims, 4 Drawing Sheets

OTHER PUBLICATIONS

Mihalcea R. M. et al.: "*Diode laser sensor for measurements of CO, $CO_2$, and $CH_4$ in combustion flows*", Applied Optics, Optical Society of America, Washington, US, vol. 36, No. 33, Nov. 20, 1997.

Docquier N. et al.: "*Combustions control and sensors: a review*", Progress in Energy and Combustions Science, Elsevier Science Publishers, Amsterdam, NL, vol. 28, No. 2, 2002, pp. 107-150.

\* cited by examiner

METHOD FOR THE TREATMENT OF ALUMINUM IN A FURNACE

BACKGROUND

The present invention relates to a method for treating aluminum in a furnace, wherein at least one material containing aluminum and optionally one or more salts and/or slag and/or recycled dross is introduced into the furnace, this material is melted by the input of heat using at least one burner supplied with oxidizer and with fuel, in order to obtain molten aluminum optionally covered with a slag comprising alumina in particular, and the concentration of carbon monoxide ($CO_m$) and/or of hydrogen ($H_{2m}$) in the furnace atmosphere or in the flue gases exiting from the furnace is measured.

In the field of the melting of secondary aluminum, this is carried out in a rotary furnace or a reverberating furnace. Although this melting method may be continuous, the melting is usually carried out in batches: the materials are charged into the furnace in one or more successive cycles before the molten metal is poured to its place of use. For this purpose, the molten metal must have a temperature of about 740° C. Above 750° C., the oxidation rate of the molten aluminum rises considerably, almost exponentially.

During a melting cycle, one can first distinguish the initial period, when the materials are solid, allowing the absorption of a large quantity of heat, the aluminum melting at about 660° C.

Irrespective of the type of furnace used, the existence of a slag or "dross" is observed on the liquid metal surface, said slag or dross being a mixture of salts (if salts are used), aluminum oxide and aluminum trapped in the oxide.

This slag or dross represents a quantity of lost or oxidized metal also called "loss on ignition" which represents a non-negligible loss of material for the aluminum producer, and which should be minimized to increase the profitability of the melting method. To reduce this oxidation, it is known how to maintain the temperature of the aluminum melt at a value lower than about 750° C. However, this method is empirical, because hot spots may appear on the surface, causing local oxidation.

Other known solutions attempt to prevent oxidation by reducing the contact of the metal surface with an oxidant.

Thus, document JP 53-227706 proposes to use the measurement of the CO and $H_2$ contents in the flue gases to ensure that, in a melting furnace for nonferrous metal, the burners installed operate in substoichiometric mode in a range of ratios of oxidant flow rate to fuel flow rate of between 95 and 100%.

Document EP 962 540 describes a combustion method for melting a metal in a furnace, in which an oxygen-rich gas is sent to the furnace, above the flame of a burner, in contact with the liquid metal.

The burner, operating in substoichiometric mode, produces a reducing flame forming a shield between the oxygen-rich gas and the molten metal surface.

Document U.S. Pat. No. 5,563,903 describes a method in which an inert or reducing gas forms a shield between the aluminum melt surface and a combustion zone located in the upper part of the furnace.

Document U.S. Pat. No. 3,759,702 describes a method in which the melting initially takes place in the open air, with a burner moving above the surface of the materials to be melted. The burner flame is slightly substoichiometric, hence reducing.

All the methods yield approximate results and are applied throughout the melting duration and not only when a risk of oxidation of the aluminum exists, because this knowledge has so far been lacking to a person skilled in the art.

SUMMARY

The invention includes methods to achieve the desired results, as described, but is not limited to the various embodiments disclosed.

The method according to the invention serves to solve the problem posed and to reduce the formation of aluminum oxides.

It is characterized in that the oxidizer supplied to at least one burner comprises more than 10% by volume of oxygen, preferably at least 21% by volume of oxygen, and in that the method comprises a final phase of reducing the oxidation of the aluminum during which the oxidizer flow rate is substantially constant while the flow rate of fuel injected into at least one burner is selected according to the concentration of metal oxide carbon monoxide ($CO_{mo}$) and/or metal oxide hydrogen ($H_{2mo}$) in the atmosphere or the flue gases or vice versa, this concentration of metal oxide carbon monoxide ($CO_{mo}$) and/or metal oxide hydrogen ($H_{2mo}$) being calculated as the difference between the measured species concentration (($CO_m$) and/or ($H_{2m}$)) and the intrinsic CO or $H_2$ species concentration caused by the combustion of the fuel and the oxidizer, including the air inlets, in the furnace with said at least one burner, but in the absence of a charge. (The intrinsic CO and $H_2$ concentration must obviously take account on the one hand of the combustion of the fuel with the oxidizer supplied to the burner, but also with the oxidizer that enters the furnace via the air inlets in said furnace, and which reacts with said fuel).

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

The invention includes a method for reducing the formation of oxides during the treatment of aluminum in a furnace, as described above.

Preferably, the oxidizer comprises more than 88% by volume of $O_2$, preferably more than 95% by volume of $O_2$. More preferably, the oxidizer is industrially pure oxygen.

The fuel may be any hydrocarbon or a light or heavy fuel oil (with a suitable fuel oil spray system in the burner): natural gas, methane, propane, etc., are preferably used. The volumetric ratio of oxygen to fuel is maintained between 1 and 5, preferably between 1.5 and 3.

According to a variant of the invention, the concentration of metal oxide carbon monoxide ($CO_{mo}$) and/or of metal oxide hydrogen ($H_{2mo}$) is kept substantially constant throughout this oxidation reduction phase at a value of between 1% and 8% by volume, preferably between 2% and 5% by volume and more preferably of about 3% by volume.

In general, the oxidation reduction phase is preceded by a hydrocarbon combustion phase during which substantially all the organic compounds present in the material are destroyed by pyrolysis, optionally (but not necessarily) followed by a stabilization phase.

Preferably, the hydrocarbon combustion phase terminates when the value of ($CO_m$) stabilizes at the imposed setpoint value, whereas the stabilization phase takes place at a constant ($CO_m$) concentration and oxygen concentration in the oxidizer that is also substantially constant. (The stabilization phase, if any, corresponds to a phase during which the solid materials are not all yet melted, but all the organic compounds have been destroyed).

The aluminum oxidation reduction phase terminates with the reintroduction of a new charge of material containing aluminum into the furnace, or by pouring liquid aluminum to its point of use.

The material containing aluminum according to the invention may be in particular, for example, aluminum in ingots, shavings from lathe work on aluminum parts, beverage and preserve cans, waste, production scrap, dross, slag containing aluminum, and, in general, any material containing aluminum. The invention obviously also applies to temperature holding furnaces for the liquid aluminum.

Figure 1A:
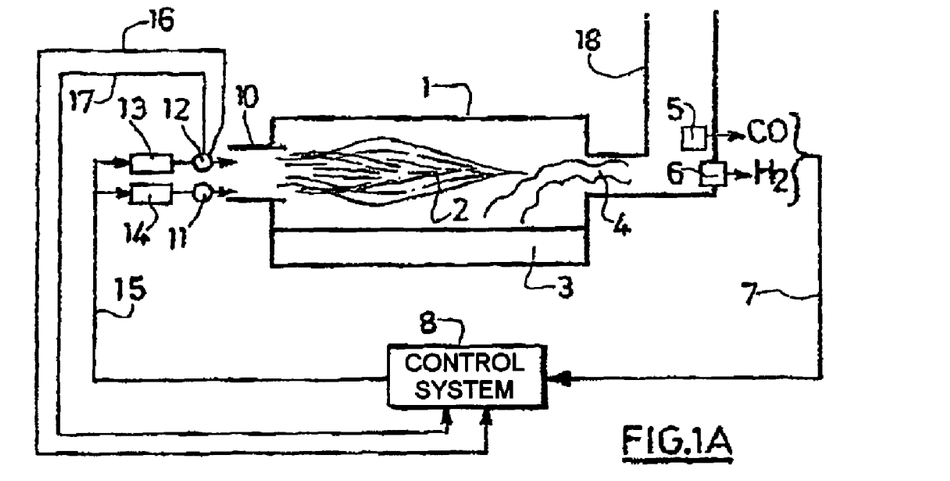
FIG. 1A illustrates a schematic view of one embodiment of a furnace and control system, as according to the current invention.

A burner 10 generates a flame 2 which heats and melts the metal 3, in liquid form. The flue gases 4 issuing from the furnace 1 and produced by combustion, particularly from the burner, are discharged via the duct 18, in which CO and/or $H_2$ detectors 5 and 6 (known per se) are placed respectively for measuring the CO and/or $H_2$ concentration in said flue gases. The indication from each of the detectors 5 and 6 is transmitted via the connecting line to a control unit 8 of which the operation is explained below. The burner 10 is supplied respectively with oxidizer 13 and fuel 14 via controlled valves 12 and 11 (mass flowmeters, for example) respectively for delivering a suitable flow rate of oxidizer and fuel to the burner. This flow rate is controlled by the control device 8, via the connecting line 15. The connecting lines 17 and 16 transmit the measurement of the opening of the valves 12 and 11 to the control system 8, which also receives data on the temperature of the molten metal 3 via a sensor. As shown below in FIG. 1B, the control system 8 comprises the adjustment of the setpoint of the CO (and/or $H_2$) concentration.

According to whether the measurement of the CO and/or $H_2$ concentration transmitted by the sensors 5 and/or 6 to the control device 8 is higher or lower than said setpoint, the device generates a control signal via the connection 15 to the controlled valves 12 and 11 which regulate the injection of oxidizer 13 and of fuel 14 to obtain a decrease or an increase in the carbon monoxide and/or hydrogen concentration in the flue gases. The control system 8 is described in greater detail in FIG. 1B. It comprises a read memory 40, in which the intrinsic (CO) and/or $H_2$ concentrations at the burner and/or the furnace are recorded. The table of these values corresponds to the various oxidizer/fuel ratios and to the various burner capacities, for the furnace used (air inlets). The memory 40 can be read by the processor 41 which also receives data on the power P of the burner used via the connection 43 and on the oxidizer/fuel ratio ($O_2$/NG ratio) via the connection 42. The control data to the valves or flowmeters 13, 14 is sent from the processor 41 via the connection 44 and the control line 15.

Figure 2:
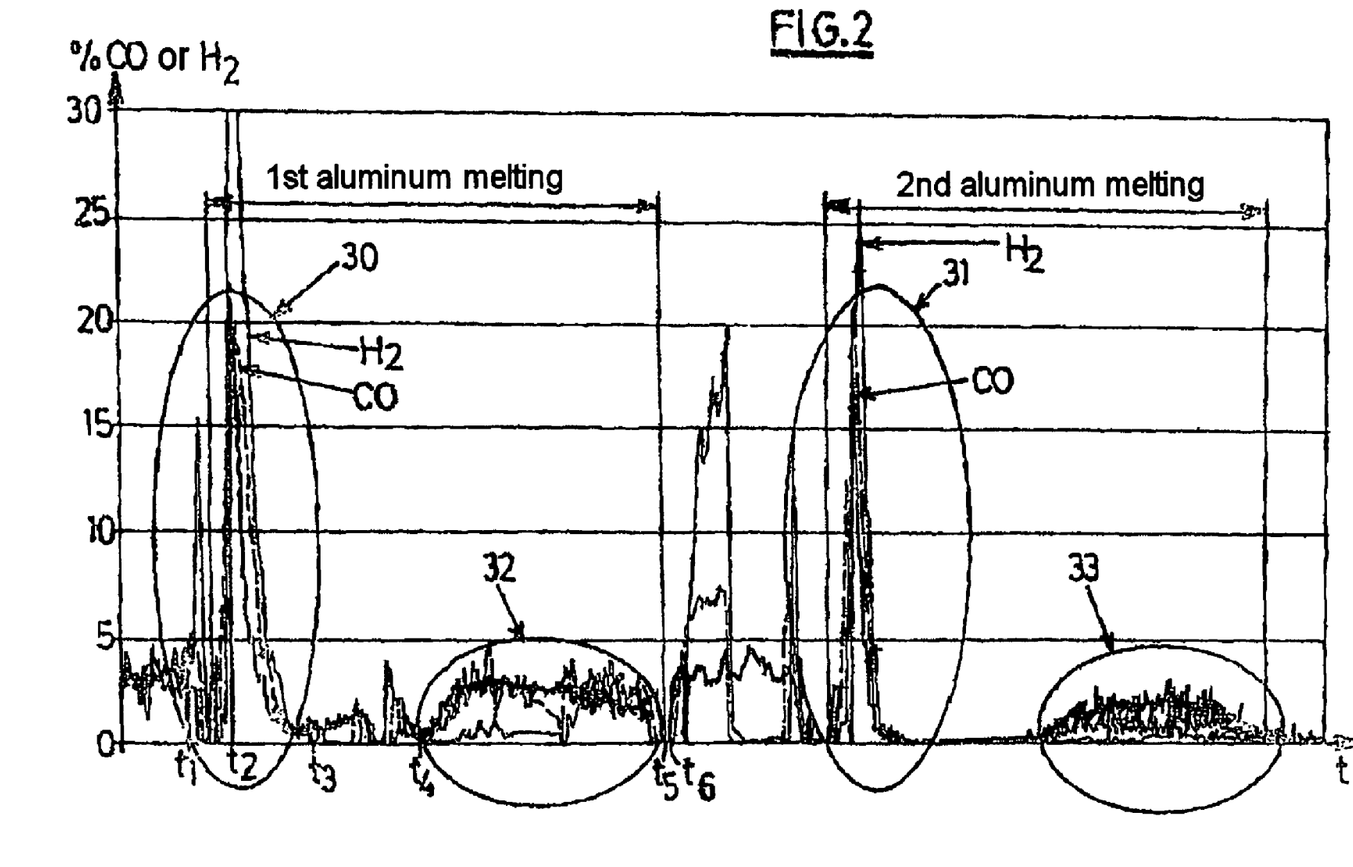
FIG. 2 illustrates a graphical representation of carbon monoxide and hydrogen concentrations, as a function of time, during aluminum meltings in a rotary type furnace, as according to the current invention.
Figure 3:
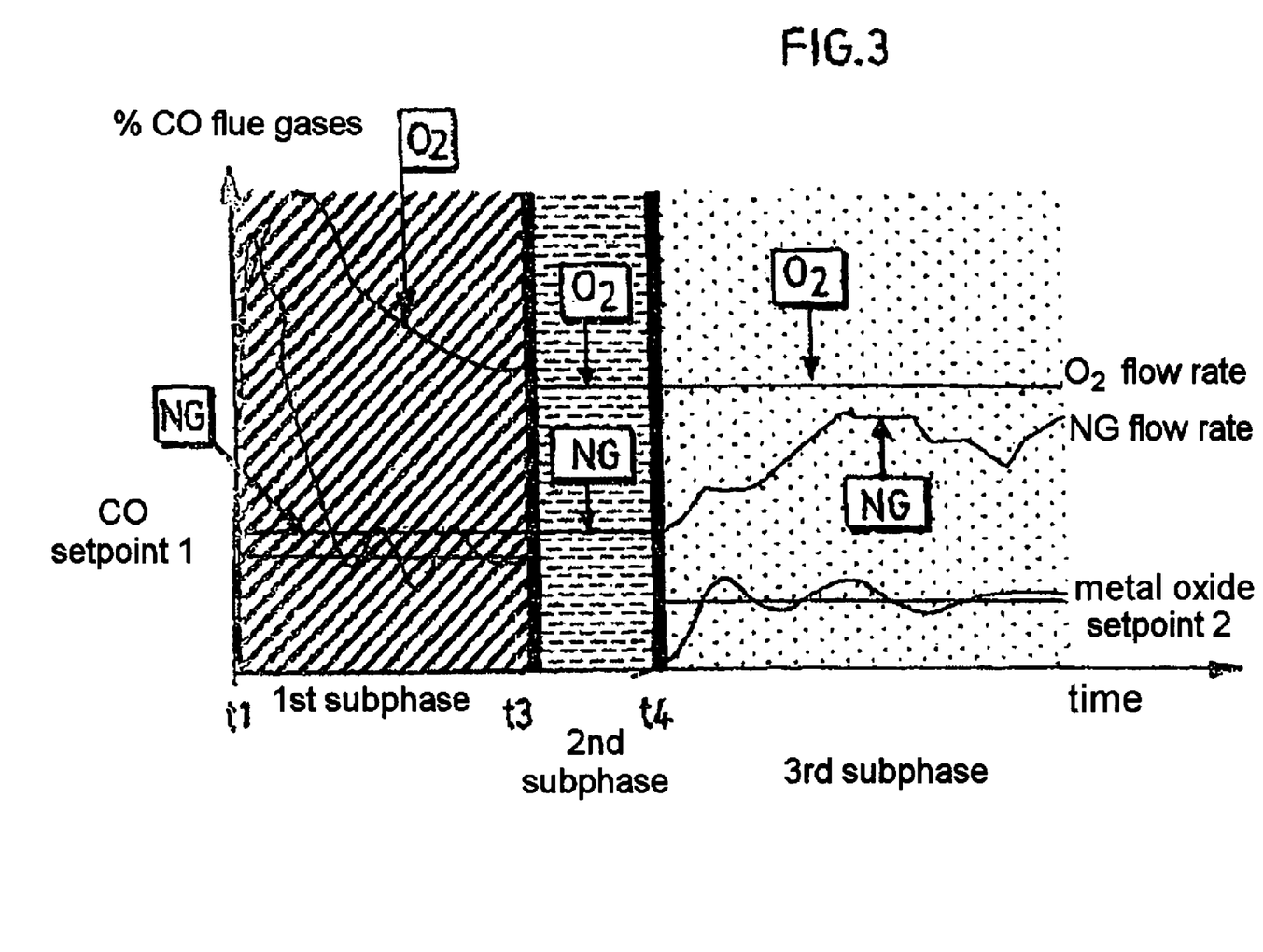
FIG. 3 illustrates a graphical representation of the variations in carbon monoxide and hydrogen, according to one embodiment of the current invention.
Figure 4:
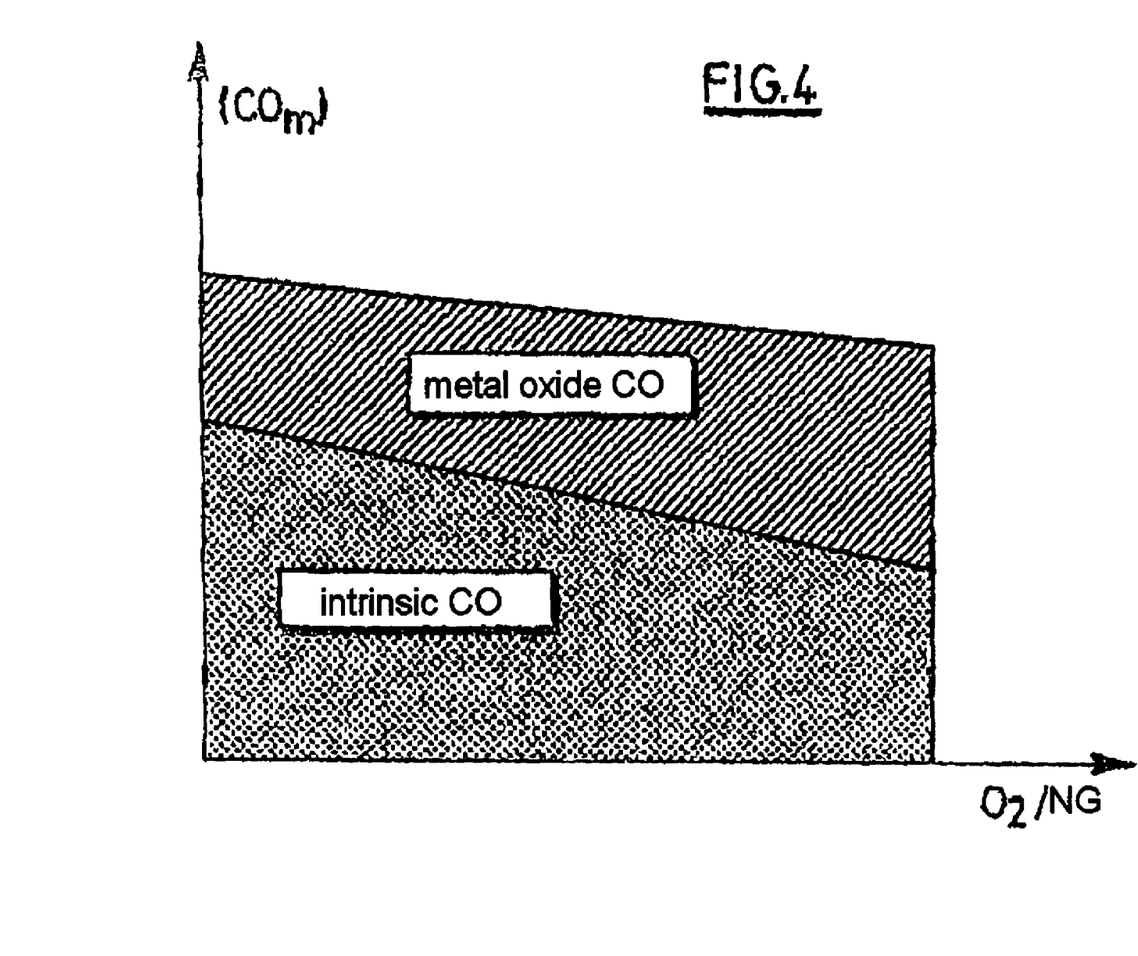
FIG. 4 illustrates a graphical representation of the variations of the metal oxide carbon dioxide and the intrinsic carbon dioxide, according to one embodiment of the current invention.

The operation of this control system and hence of the method according to the invention will be better understood with the help of FIGS. 2 to 4.

FIG. 2 shows the variations in concentration of CO or $H_2$ in the flue gases exiting from the furnace, as a function of time, without the implementation of the invention, that is, without regulating the combustion as a function of the metal oxide CO.

The aluminum melting furnace is initially charged with materials containing aluminum such as aluminum waste, scrap, etc., and optionally salts which create a molten layer of salts above the melt surface, thereby protecting this surface from oxidation.

In FIG. 2, the end of this charging takes place at time t1. At this time, the CO and $H_2$ concentrations detected in the flue gases exiting from the furnace are low (about 0.03 on the scale used in this figure) corresponding to the flame combustion gases only (by the combustion of a hydrocarbon—such as $CH_4$—with oxygen, a flame ideally produces a mixture of $CO_2$ and $H_2O$ if combustion is complete).

In practice, said combustion is never complete and also produces hydrogen $H_2$ and carbon monoxide CO.

As the temperature of the charge rises, the organic compounds present therein burn rapidly to generate additional CO and $H_2$, besides the complete combustion products $H_2O$ and $CO_2$. This results in a CO and $H_2$ concentration peak 30 that is rapidly reached at time $t_2$ in the figure.

The concentration peak 30 then falls rapidly because of the rapid pyrolysis of organic compounds and, at time $t_3$, this concentration has become very low and remains very low up to time $t_4$, when it rises to a value similar to the value it had before the charge was introduced. The end of the charge melting phase takes place at time $t_5$. After this first melting, a second aluminum charge is melted: the opening of the furnace door at time $t_6$ causes disturbances in the composition of the atmosphere above the bath, visible in FIG. 2, before a new $H_2$ and CO peak due to the combustion of the organic compounds.

FIG. 3 shows the various subphases (of each different phase of first melting, second melting, etc.) of the method according to the invention: this figure shows the CO concentration in the flue gases exiting from the furnace as a function of time. The times $t_1$, $t_3$ and $t_4$ have the same meaning as in FIG. 2. The curve refers to a CO concentration. A similar curve would be obtained using the hydrogen concentration in the flue gases as a parameter. The first phase of the first aluminum melting is approximately located between times $t_1$ and $t_2$. In this phase, the introduction of a charge of materials containing aluminum suddenly raises the CO concentration in the atmosphere above the metal bath and hence in the flue gases. In fact, the organic matter (grease, etc.) essentially contains the elements carbon and hydrogen, which react with the oxygen available in the atmosphere to produce CO, $CO_2$, hydrogen and water vapor. This additional fuel input therefore requires a supplementary oxygen input in order to rapidly decrease the CO concentration in the atmosphere and return it to the "CO setpoint 1" setpoint value. (Reducing the CO and/or $H_2$ concentration to this lower setpoint value in fact serves to make said CO and/or $H_2$ react with the oxygen present in the atmosphere and therefore add energy to the furnace, without consuming additional NG fuel). The NG fuel flow rate can therefore remain constant while the oxidizer flow rate (containing a variable quantity of oxygen) increases and passes through a peak (slightly offset from the CO peak because of the control loop) and then falls back to its initial value 1. When the oxygen flow rate has returned to its initial value 1, this means that the first step of pyrolysis of the organic compounds in the charge introduced is terminated.

Hence time $t_2$ marks the beginning of the stabilization phase during which NG fuel and oxidizer $O_2$ are introduced (into the burner) at a constant flow rate, thereby adding constant power to the charge and developing a preferably non-oxidizing or slightly oxidizing atmosphere above the molten bath.

According to the invention, the burner is controlled according to the oxidation of the aluminum, observed in the furnace, by the method described below.

The aluminum reacts with the combustion gases from the burner by the following reactions:

$2Al+3CO_2 \rightarrow Al_2O_3+3CO$ (called metal oxide CO below)

$2Al+3H_2O \rightarrow Al_2O_3+3H_2$ (called metal oxide $H_2$ below)

$2Al+\tfrac{3}{2}O_2 \rightarrow Al_2O_3$

All other things remaining equal, the appearance of carbon monoxide or hydrogen in the flue gases from the furnace, or the variation in carbon monoxide or hydrogen concentration in the flue gases, serves to detect the oxidation of the aluminum.

For this purpose, the oxidizer/fuel ratio (OFR) supplied to the burner is controlled as a function of the oxidation detected, with the oxidizer, which is a fluid, containing oxygen, for example air or pure oxygen or oxygen enriched air, and the Fuel, which is a fluid, containing materials likely to react with the oxygen present in the oxidizer to release energy, such as, for example, natural gas, fuel oil, coal, etc.

For this control, the CO and/or $H_2$ emissions from the burner (placed in the furnace, in the absence of charge to be heated, to take account of air inlets, this air reacting with the CO and $H_2$ present in the furnace atmosphere) are measured for several oxidizer/fuel ratios in order to determine the correlation between the characteristic compositions of the flue gases in the furnace and the adjustment of the burner. Thus for each OFR, the proportion of CO and $H_2$ in the flue gases, when the burner operates without a charge to be heated, are known and are respectively called the intrinsic CO concentration and the intrinsic $H_2$ concentration. All these data stored in the memory 40 (FIG. 1B) connected to a microprocessor 41 which also receives data on the burner power P, on the oxidizer/fuel "$O_2$/GB ratio" and other necessary parameters, such as the measurement of $(CO_m)$ or $(H_{2m})$ issuing from 7 and which delivers at 44 a signal proportional to (or a function of) the value of $(CO_{mo})$ or of $(H_{2mo})$, via the control line 15 to the flowmeters 13 and 14. The flue gases are analyzed continuously by appropriate means, such as, for example, an extraction system for taking an analytical sample or a system for measuring the absorption of radiation emitted by a laser diode (for CO), for at least one of the species CO or $H_2$, the measured value being called $CO_m$ or $H_{2m}$, to denote the total CO or $H_2$ concentration in the flue gases.

The OFR is then adjusted to maintain the difference ($CO_m$–COintrinsic) or ($H_{2m}$–$H_2$intrinsic) below the desired level (CO or metal oxide $H_2$ setpoint value). (The differences $CO_m$–COintrinsic or $H_{2m}$–$H_2$intrinsic are respectively called "metal oxide CO" ($CO_{mo}$) or "metal oxide $H_2$" ($H_{2mo}$), because they are created by a chemical reaction between the aluminum and the gases in the furnace atmosphere).

According to the invention, the OFR is controlled according to the constantly calculated concentration of metal oxide CO and/or metal oxide hydrogen, these concentrations reflecting the oxidation of the aluminum.

Thus, in the $1^{st}$ subphase (FIG. 3), the NG fuel flow rate is constant, and the oxidizer $O_2$ flow rate is a function of the measured total CO (stabilization of the setpoint value).

During the $2^{nd}$ subphase, the NG and $O_2$ flow rates are regulated to the respective points, without taking account of the measurement of the CO concentration in the setpoint flue gases.

During the $3^{rd}$ subphase, the $O_2$ flow rate is constant and the NG flow rate is a function of the chemical CO, calculated as the difference between the measured CO and the intrinsic CO value of the burner for the burner OFR, this value being stored in memory in the control system 8.

In general, the change of subphase (at times $t_3$ and $t_4$) is determined by a volume of NG or a volume of oxygen injected into the furnace during the phase concerned. This solution may be preferable because the system thereby takes account of any burner shutdowns.

The $O_2$/NG volumetric ratio (OFR) is preferably kept within limits of between 1.5 and 3 ($O_2$ indicates the volume of oxygen in the oxidizer and NG denotes any fuel).

Preferably, on the subphases 1 and 3, the CO and/or $H_2$ of the total CO setpoint for the $1^{st}$ subphase (setpoint 1) and metal oxide CO on the $3^{rd}$ subphase (setpoint 2) can be parameterized: for example, a setpoint value for CO or hydrogen of about 3% by volume can be used.

FIG. 4 schematically shows the variation in total CO concentration in the flue gases as a function of the OFR $O_2$/NG volumetric ratio used. Thus, the lower the OFR, the more CO is generated by the burner, whereas the share of metal oxide CO decreases in the total CO, showing that the oxidation of aluminum decreases, although the total CO increases.

This conclusion clearly shows how the invention is completely different from the solutions of the prior art, because, according to the invention, the CO (or $H_2$) concentration in the flue gases can be readily increased to decrease the oxidation and hence the quantity of dross formed, thereby reducing the metal loss on ignition.

According to a variant of the invention, it is possible (conversely) to preserve a constant NG fuel flow rate and regulate the oxidizer injection in the burner. This may lengthen the cycle time, which is unfavorable to the oxidation of aluminum. This effect (more thermal power required) can be compensated by using an oxidizer with a higher oxygen concentration, preferably more than 88% oxygen. Another variant, basically more complicated, may consist in regulating the flow rates of the oxidizer as well as the fuel.

Likewise, according to another variant of the invention, which can also yield good results when the air inlets into the furnace are low, consists in ignoring these air inlets in determining the intrinsic CO and/or $H_2$ concentration and in considering only the CO and $H_2$ species generated by the burner.

Embodiment of the Invention

Firstly, during prior tests, the furnace is charged with about 65 tons of materials that do not emit organic compounds, nor CO, nor $H_2$ (or in very negligible quantities) during their pyrolysis, for example salt (NaCl or KCl) or an aluminum alloy, free of enamel, paint, grease, etc.

For each burner power, and particularly for the nominal melting power, or 13 MW, the $CO_m$ (and/or $H_{2m}$) concentrations are measured by varying the OFR ratio typically between 1.5 and 3.

Figure 1B:
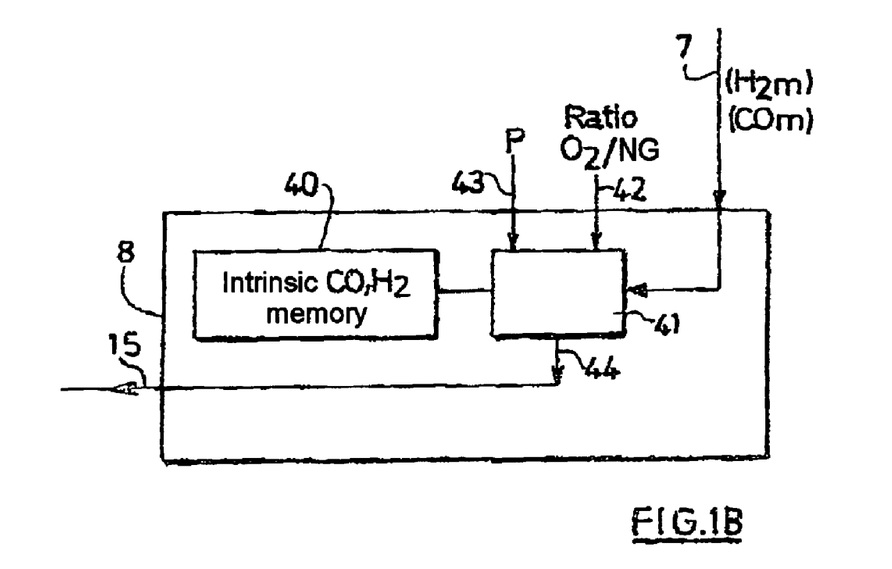
FIG. 1B illustrates a schematic view of one embodiment of a control system, as according to the current invention.

This gives the intrinsic CO (and/or $H_2$) concentrations, which essentially depend on the adjustment of the burner and the air inlets in the furnace, and which are stored in the table of the memory 40 for subsequent rereading.

During the implementation of the invention on a four-phase charging as described above, all the phases, except for the last one for reheating the salts, are divided into three subphases: an organic compound combustion subphase, a transition or stabilization subphase, and, finally, an oxidation reduction subphase. The change in subphase is determined by the cumulative volume of fuel (natural gas here). The values used are given in the table below and are determined during an initial audit of the furnace.

In the first subphase, the $CO_m$ setpoint is set at a value of 1% for all the phases (except the last).

In the stabilization subphase, which is very short in practice as shown in the table, the fuel and natural gas flow rates are assigned fixed values, and the OFR ratio therefore does not vary. For the nominal power of 13 MW, the natural gas flow rate is set at 1300 $Nm^3$/h and the oxygen flow rate at 2500 $Nm^3$/h for all the phases.

Finally, in the third oxide reduction subphase, the metal oxide CO ($CO_{mo}$) or ($H_{2mo}$) setpoint is set at 1.5%.

In the final salt superheating phase, the parameters are adjusted as in the stabilization subphase (fixed flow rates, fixed OFR).

| Phase | Subphase | Cumulative NG Range | CO Setpoint | $CO_{mo}$ Setpoint | $CO_m$ Measurement |
|---|---|---|---|---|---|
| 1. Salt charge | 1. Organic | 0000-1500 | 1% | — | 1%-7% |
|  | 2. Transition | 1500-1600 | — | — | 0.5%-4% |
|  | 3. Oxidation | 1600-2550 | — | 1.5% | 2%-5% |
| 2. $1^{st}$ aluminum melting | 1. Organic | 2550-2800 | 1% | — | 1%-4% |
|  | 2. Transition | 2800-2850 | — | — | 0.5%-2% |
|  | 3. Oxidation | 2850-3400 | — | 1.5% | 2%-7% |
| 3. $2^{nd}$ aluminum melting | 1. Organic | 3400-3750 | 1% | — | 1%-4% |
|  | 2. Transition | 3750-3800 | — | — | 0.5%-2% |
|  | 3. Oxidation | 3800-4750 | — | 1.5% | 2%-10% |
| 4. Salt superheating | Fixed OFR | 4750-5500 | — | — | 0%-2% |

Values of imposed parameters and typical values of the measurement for the method described above.

(The cumulative values are only valid for the charged quantities indicated above.)

As a function of a number of parameters, particularly of the liquid aluminum temperature, the measured $CO_m$ is observed to vary roughly between 2% and 10%. In the third subphase, before the pouring of the aluminum ($2^{nd}$ aluminum charging), the regulation according to the invention imposes a burner ratio close to the minimum permitted (1.5), and hence a high intrinsic CO (up to about 8.5%-9%), in order to guarantee a minimal controlled oxidation of the liquid aluminum close to its pouring temperature.

COMPARATIVE EXAMPLE

Prior Art and Invention on the Same Furnace 27 tons of salt and 27 tons of aluminum waste were charged in a rotary furnace equipped with a 13 MW burner, the charge was heated to a natural gas consumption of 2500 $Nm^3$ (prior art method) or 2550 $Nm^3$ (method according to the invention), 65 tons of aluminum waste was then again charged and the charge was heated to the consumption of 3300 $Nm^3$ of natural gas (prior art), or 3400 $Nm^3$ (invention). 35 tons of aluminum waste was then again charged and the charge heated to consumption of 4600 $Nm^3$ of natural gas (prior art), or 4750 $Nm^3$ (invention), 98 tons of aluminum was then poured (prior art), and 99 tons of aluminum was poured (invention), the salts and dross present in the furnace were then heated to the consumption of 5350 $Nm^3$ of natural gas (prior art) or 5500 $Nm^3$ of natural gas (invention). Finally, the aluminum remaining in the furnace was poured: 9 tons of aluminum (prior art and invention).

The combustion of the burner was controlled according to the invention by the analysis of the CO measured by a laser diode installed on the duct of the stack ($CO_m$). In the prior art, the oxidizer/fuel ratio is kept constant, thereby roughly keeping the total CO constant if the temperature is controlled.

The following results were then obtained (results of the invention in the previous application).

|  | Units | Prior art method | Method according to invention |
|---|---|---|---|
| Natural gas consumed | $Nm^3$ | 5350 | 5500 |
| Oxygen consumed | $Nm^3$ | 9900 | 10300 |
| Melting time | min | 465 | 460 |
| Aluminum temperature at end of melting | ° C. | 743 | 741 |
| Weight of oxidized aluminum | kg | 2750 | 1800 |
| Weight of salt and dross | tons | 30 | 29 |
| Weight of aluminum produced | tons | 107 | 108 |

Note that the 150 $Nm^3$ of additional fuel required in this case to implement the invention represents a fairly minor extra cost compared with the value of the aluminum recovered.

It is also important to mention that for certain types of charge with a high concentration of organic matter, the energy recovered during the first subphases (combustion of organic compounds) serves to compensate for the additional fuel required for the third subphases, so that the total consumption of a cycle is equal to or even lower than that of the initial method.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for treating aluminum in a furnace, said method comprising:
   a) introducing a material into a furnace, wherein said material comprises aluminum;
   b) melting said material with heat from at least one burner, wherein:
       1) said burner is supplied with at least one oxidizer and at least one fuel; and
       2) said oxidizer comprises at least about 10% by volume of oxygen;
   c) obtaining molten aluminum;
   d) measuring the concentration of a first gas in the furnace atmosphere or in a flue gas exiting said furnace, wherein said first gas comprises at least one member selected from the group consisting of:
1) hydrogen; and
2) carbon monoxide; and
e) reducing the oxidation of said molten aluminum, wherein:
1) said reducing the oxidation comprises holding the flow rate of said oxidizer substantially constant while varying the flow rate of said fuel according to the concentration of a second gas in said furnace atmosphere or in said flue gas;
2) said second gas comprises at least one member selected from the group consisting of:
i) metal oxide hydrogen; and
ii) metal oxide carbon monoxide; and
3) said concentration of said second gas is calculated based on the difference between a measured species concentration and an intrinsic species concentration which would be present from the combustion of said fuel and said oxidizer in the absence of said material in said furnace.

2. The method of claim 1, wherein said material further comprises at least one salt.

3. The method of claim 1, wherein said molten aluminum is substantially covered with a slag comprising alumina and at least one salt.

4. The method of claim 1, wherein said oxidizer comprises at least about 21% by volume of oxygen.

5. The method of claim 4, wherein said oxidizer comprises at least about 88% by volume of oxygen.

6. The method of claim 5, wherein said oxidizer comprises at least about 95% by volume of oxygen.

7. The method of claim 1, wherein said oxidizer is pure industrial oxygen.

8. The method of claim 1, wherein said fuel comprises at least one member selected from the group consisting of:
a) natural gas;
b) hydrocarbons;
c) light fuel oil; and
d) heavy fuel oil.

9. The method of claim 1, wherein a volumetric ratio of said oxidizer to said fuel is between about 1 and about 5.

10. The method of claim 9, wherein said ratio is between about 1.5 and about 3.

11. The method of claim 1, wherein said concentration of said second gas is substantially constant, during said oxidation reduction, at a value between about 1% and about 8% by volume.

12. The method of claim 11, wherein said value is between about 2% and about 5% by volume.

13. The method of claim 12, wherein said value is about 3% by volume.

14. The method of claim 1, further comprising destroying substantially all organic products in said material, by pyrolysis, during a hydrocarbon combustion phase which occurs prior to said oxidation reduction.

15. The method of claim 14, further comprising stopping said hydrocarbon combustion phase when the measured value of said concentration of said first gas stabilizes at an imposed set point value.

16. The method of claim 15, wherein said flow rate of said oxidizer is substantially constant.

17. The method of claim 1, further comprising introducing a new charge of material into said furnace when said oxidation reduction is complete.

18. The method of claim 1, further comprising measuring said concentration of said first gas with a laser diode.

19. The method of claim 1, further comprising measuring carbon monoxide in said furnace with a laser diode.

20. A method for treating aluminum in a furnace, said method comprising:
a) introducing a material into a furnace, wherein said material comprises aluminum;
b) melting said material with heat from at least one burner, wherein:
1) said burner is supplied with at least one oxidizer and at least one fuel; and
2) said oxidizer comprises at least about 10% by volume of oxygen;
c) obtaining molten aluminum;
d) measuring the concentration of a first gas in the furnace atmosphere or in a flue gas exiting said furnace, wherein:
1) said first gas comprises at least one member selected from the group consisting of:
i) hydrogen; and
ii) carbon monoxide; and
2) said concentration of said first gas is measured with a laser diode;
e) destroying by pyrolysis substantially all organic products in said material;
f) stopping said pyrolysis when the measured value of said concentration of said first gas stabilizes at an imposed set point value;
g) reducing the oxidation of said molten aluminum, wherein:
1) said reducing the oxidation comprises holding the flow rate of said oxidizer substantially constant while varying the flow rate of said fuel according to the concentration of a second gas in said furnace atmosphere or in said flue gas;
2) said second gas comprises at least one member selected from the group consisting of:
i) metal oxide hydrogen; and
ii) metal oxide carbon monoxide; and
3) said concentration of said second gas is calculated based on the difference between a measured species concentration and an intrinsic species concentration which would be present from the combustion of said fuel and said oxidizer in the absence of said material in said furnace.

21. A method for treating aluminum in a furnace, said method comprising:
a) introducing a material into a furnace, wherein said material comprises aluminum and at least one salt;
b) melting said material with heat from at least one burner, wherein:
1) said burner is supplied with at least one oxidizer and at least one fuel;
2) said oxidizer comprises at least about 21% by volume of oxygen; and
3) the volumetric ratio of said oxidizer to said fuel is between about 1 and about 5;
c) obtaining molten aluminum;
d) measuring the concentration of a first gas in the furnace atmosphere or in a flue gas exiting said furnace, wherein said first gas comprises at least one member selected from the group consisting of:
1) hydrogen; and
2) carbon monoxide; and
e) reducing the oxidation of said molten aluminum, wherein:
1) said reducing the oxidation comprises holding the flow rate of said oxidizer substantially constant while varying the flow rate of said fuel according to the concentration of a second gas in said furnace atmosphere or in said flue gas;
2) said second gas comprises at least one member selected from the group consisting of:
   i) metal oxide hydrogen; and
   ii) metal oxide carbon monoxide;
3) said concentration of said second gas is calculated based on the difference between a measured species concentration and an intrinsic species concentration which would be present from the combustion of said fuel and said oxidizer in the absence of said material in said furnace; and
4) said concentration of said second gas is substantially constant, during said oxidation reduction, at a value between about 1% and about 8% by volume.

* * * * *